United States Patent [19]
Garner

[11] Patent Number: 5,496,174
[45] Date of Patent: Mar. 5, 1996

[54] METHOD AND DEVICE FOR PRODUCING A TACTILE DISPLAY USING AN ELECTRORHEOLOGICAL FLUID

[75] Inventor: H. Douglas Garner, Newport News, Va.

[73] Assignee: The United States of America as represented by the Administrator of the National Aeronautics and Space Administration, Washington, D.C.

[21] Appl. No.: 286,031

[22] Filed: Aug. 4, 1994

[51] Int. Cl.⁶ ................................................. G09B 21/00
[52] U.S. Cl. ............................................ 434/114; 434/113
[58] Field of Search ................................. 434/114, 113, 434/112; 40/406, 407, 439, 477; 340/407.1, 407.2

[56] References Cited

U.S. PATENT DOCUMENTS

| | | |
|---|---|---|
| 3,659,354 | 5/1972 | Sutherland . |
| 3,924,019 | 12/1975 | Jacob . |
| 4,033,053 | 7/1977 | Engler . |
| 4,044,350 | 8/1977 | Tretiakoff et al. . |
| 4,183,683 | 1/1980 | Hiratsuki et al. . |
| 4,191,945 | 3/1980 | Hannen et al. . |
| 4,194,190 | 3/1980 | Bareau . |
| 4,266,936 | 5/1981 | Rose et al. . |
| 4,283,178 | 8/1981 | Tetzlaff . |
| 4,473,356 | 9/1984 | Fernando et al. . |
| 4,571,190 | 1/1986 | Zagler et al. . |
| 4,687,444 | 8/1987 | Garner . |
| 4,758,165 | 7/1988 | Tieman et al. . |
| 4,879,698 | 11/1989 | Langberg . |
| 4,898,536 | 2/1990 | Hoffarth . |
| 5,222,895 | 6/1993 | Fricke . |

FOREIGN PATENT DOCUMENTS

| | | | |
|---|---|---|---|
| 0448187 | 9/1991 | European Pat. Off. | ............... 434/114 |
| 2212336 | 7/1989 | United Kingdom | ................... 434/114 |

OTHER PUBLICATIONS

Applications of the Electrorheological Effect in Engineering Practice, Fluid Mechanics, Soviet Research, vol. 8, No. 4, Jul.–Aug. 1979.

*Primary Examiner*—Gene Mancene
*Assistant Examiner*—Jeffrey A. Smith
*Attorney, Agent, or Firm*—Robin W. Edwards

[57] ABSTRACT

A tactile display device utilizes an electrorheological fluid to activate a plurality of tactile dots. A voltage is selectively produced uniformly across an electrorheological fluid flowing between a common ground electrode and a plurality of conductive dot electrodes, thereby producing an increase in the fluid's viscosity to the extent that fluid flow between the two electrodes is restricted. The flow restriction produces a build-up of electrorheological fluid in a corresponding dot actuator chamber. The resulting pressure increase in the chamber displaces an elastic diaphragm fixed to a display surface to form a lump which can be perceived by the reader as one dot in a Braille character cell. A flow regulation system provides a continually pressurized flow system and provides for free flow of the electrorheological fluid through the plurality of dot actuator chambers when they are not activated. The device is adaptable to printed circuit techniques and can simultaneously display tactile dots representative of a full page of Braille characters stored on a medium such as a tape cassette or to display tactile dots representative of non-Braille data appearing on a computer monitor or contained on another data storage medium. In an alternate embodiment, the elastic diaphragm drives a plurality of spring-loaded pins provided with positive stops to maintain consistent displacements of the pins in both their actuated and nonactuated positions.

15 Claims, 3 Drawing Sheets

METHOD AND DEVICE FOR PRODUCING A TACTILE DISPLAY USING AN ELECTRORHEOLOGICAL FLUID

ORIGIN OF THE INVENTION

The invention described herein was made by an employee of the United States Government and may be manufactured and used by the government for governmental purposes without the payment of any royalties thereon or therefor.

TECHNICAL FIELD

This invention relates generally to a device for displaying and refreshing a full page of tactile output representative of a computer screen or other data storage medium. More particularly, the present invention relates to a device utilizing an electrorheological fluid to interact with a display for transmitting information that may be tactually felt by the user. Specifically, the present invention relates to a tactile display device which is adaptable to printed circuit techniques, wherein an individual tactile dot is raised due to a build-up of electrorheological fluid in a dot actuator chamber resulting from a voltage applied across an electrorheological fluid flowing between a common ground electrode and an individual conductive dot electrode corresponding to an individual tactile dot.

BACKGROUND ART

Many persons with vision impairments use Braille to communicate and could benefit from improved, refreshable Braille displays. Electronic encoding and storage of data are now an established capability for Braille information, as is the distribution system for recorded media or electronic media. With the advent of personal computers and large CD-ROM database libraries containing millions of print characters, the blind need Braille displays that allow them complete access to the information displayed on a computer monitor or located on some data storage medium. Advanced Braille technology will offer the potential for dramatic improvements in telecommunications access for persons with sensory impairments, including access to databases, electronic mail systems, bulletin board systems and mail order systems. Miniature actuators for a low cost, high density, refreshable Braille display to enable persons with severe visual impairments to read out printed material recorded in computer memory or in another data storage medium are needed.

Numerous devices currently exist which convert stored data into a tactile representation. Braille characters may be displayed, a few at a time, on an array of "Braille cells." Each cell consists of a group of pins which may be individually raised from the surface of the device to form the particular Braille character desired. Each pin of each character must be independently actuated by a magnetic (see U.S. Pat. Nos. 4,194,190 and 4,571,190), piezoelectric (see U.S. Pat. Nos. 4,044,350; 4,283,178; 4,473,356; 4,758,165 and 4,879,698), pneumatic (see U.S. Pat. No. 3,659,354) or electromechanical (see U.S. Pat. Nos. 4,033,053; 4,898,536 and 4,191,945) device controlled by inputs from a data storage medium. Each of these devices requires a large number of actuation devices and a relatively large device for displaying the entire page. Such devices would be expensive and bulky.

U.S. Pat. No. 4,266,936 discloses a portable Braille display unit which presents an entire page of Braille characters by means of spring actuated pins controlled by bimetallic latches. An immediate tactile display is provided which may be read out and then refreshed to read out the next group of characters. Although this device is lighter in weight and smaller in size than the previous art, each cell involves a rather complex mechanism and an assembly of cells representing a line of text becomes quite expensive.

The Braille characters may also be embossed on paper by a special Braille printer (see U.S. Pat. Nos. 3,924,019 and 4,183,683.) The Braille printers are necessarily quite bulky and expensive and require the reader to wait for the material to be printed out before it can be read.

U.S. Pat. No. 4,687,444 discloses a position detecting mouse with a Braille display located on its upper surface. The mouse scans a single Braille cell through the text as the reader progresses but does not allow for the presentation of a complete page of text at one time.

Thus, key limitations for full-page, refreshable Braille displays are the cost and size of the mechanism. Solution of this problem must focus on the actuator method to temporarily produce raised dots, approximately 6000 or more per page. This new actuator method must allow sufficiently dense packing while having low power requirements and low cost. A page size of 11 by 11 inches, the page layout of the Perkins Brailler, is regarded by many as the most desirable page size. In addition, a display of 25 lines of 40 characters each has become the standard within the industry.

Recently, Joerg Fricke, in his U.S. Pat. No. 5,222,895 issued Jun. 29, 1993, disclosed an input/output device which employs an electrorheological fluid to drive tactile display elements. Electrorheological fluids experience a substantial increase in viscosity when subjected to a strong electrostatic field. Fricke's device has several advantages over the earlier art, including smaller size display elements and a reduced number of moving parts. These advantages result in a page-sized display produced at a lower cost than what was previously possible. The half-cylindrical electrode geometry disclosed in Fricke's device, however, will inhibit the use of printed circuit techniques in the manufacturing process. These techniques lend themselves much better to manufacturing flat surfaces. Use of the half-cylindrical electrode configuration to apply voltage across the electrorheological fluid also induces a voltage gradient across the electrorheological fluid rather than a desired uniform voltage, therefore requiring higher voltage supply to the electrodes which reduces the efficiency of the device. Also, the electrical drive circuitry disclosed in Fricke is required to control voltage to either two or four electrodes for each dot. With 6000 or more tactile dots required for a single page of Braille characters, the number of electrodes required to be driven for a single dot is an important cost consideration. In addition, Fricke's device requires multiple voltage supplies rather than a single voltage supply. Lastly, Fricke's device appears to require the flow system to be pressurized and unpressurized for each cycle of dot actuation. It would be advantageous to have a device which allows for the use of printed circuit techniques, avoids pressurizing and unpressurizing the fluid flow system, minimizes the number of electrodes required to be driven, and minimizes the high voltage requirement.

STATEMENT OF THE INVENTION

Accordingly, one object of the invention is to provide a full-page tactile display device at a minimum expense.

Another object is to provide a full-page tactile display device with minimum complexity.

Another object is to provide a tactile display device which can be adapted to manufacture by batch production techniques such as printed circuit, photo-etching, and injection molding methods.

A further object of the invention is to utilize the characteristics of electrorheological fluids to implement large arrays of electrically actuated Braille character cells.

Another object is to provide a tactile display device having an efficient method of applying voltage to the electrorheological fluid.

Another object is to provide a tactile display device which avoids unwanted pressure build-up of the electrorheological fluid.

Another object of the invention is to provide a tactile display device which minimizes the high voltage requirement.

Another object is to provide a tactile display device which minimizes the number of high-voltage supplies.

Another object is to provide a tactile display device which minimizes the number of electrodes which are required to be driven.

Still another object is to provide a tactile display device which avoids pressurizing and unpressurizing the entire electrorheological fluid flow system for each cycle of tactile dot actuation.

Yet another object of the invention is to provide a tactile display device which provides consistent up and down positions among the plurality of tactile dots.

Additional objects and advantages of the present invention are apparent from the drawings and specification which follow.

SUMMARY OF THE INVENTION

According to the present invention, the foregoing and other objects and advantages are attained by providing a tactile display device which utilizes an electrorheological fluid to activate a plurality of tactile dots representative of electrical signal inputs, wherein voltages are selectively supplied across an electrorheological fluid flowing between a single common ground electrode and a plurality of conductive dot electrodes. The common ground electrode is mounted on the lower surface of an upper nonconductive plate. The conductive dot electrodes are mounted on the upper surface of a lower nonconductive plate which is positioned beneath and in close proximity to the common ground electrode. The upper nonconductive plate has a plurality of through holes extending from its upper to lower surfaces. The holes form dot actuator chambers. Each dot actuator chamber has one corresponding conductive dot electrode. The voltage across the electrorheological fluid between the common ground electrode and a conductive dot electrode produces an increase in the fluid's viscosity to the extent that fluid flow between the two electrodes is restricted, thereby causing the fluid to build up in the corresponding dot actuator chamber. An elastic diaphragm defines the upper end of each dot actuator chamber and interacts with the chambers to convert the build-up of electrorheological fluid in the chambers into the tactile display. The flow of the electrorheological fluid is controlled such that the overall flow system is continually pressurized and unwanted pressure build-up in the dot actuator chambers is prevented.

The electrorheological fluid is stored in a fluid source from which it is pumped into a plurality of parallel supply manifolds. Each supply manifold supplies fluid to a plurality of dot actuator chambers on both of its sides by way of flow restricting orifices. The fluid then flows out of each dot actuator chamber by way of an exhaust orifice, positioned through the common ground electrode. The exhaust orifice has a larger flow area than the flow restricting orifice so that unwanted pressure is not built up in the dot actuator chamber. The fluid then flows through a valving region created by the clearance between the common ground electrode and each conductive dot electrode. The relative placement of the common ground electrode to the conductive dot electrodes is such that the necessary voltage across the electrorheological fluid is reduced and sufficient clearance is provided for the electrorheological fluid to flow out of the dot actuator chamber, thereby preventing unwanted pressure build-up in the dot actuator chamber. Based on an electrical signal input, a voltage is selectively supplied to a conductive dot electrode, thereby producing a voltage across the electrorheological fluid between the common ground electrode and the conductive dot electrode. The voltage across the fluid increases the viscosity of the fluid to the extent that fluid flow between the two electrodes is restricted. The resulting pressure increase in an individual dot actuator chamber displaces the elastic diaphragm fixed to the display surface to form a lump which can be perceived by the reader as one dot in a Braille character cell. The device can also be used to produce arrangements of tactile dots other than Braille characters, such as graphics displays.

The conductive dot electrodes can be fabricated on the lower nonconductive plate by automated printed circuit manufacturing techniques. The device can be adapted to simultaneously display tactile dots representative of a full page of Braille characters stored on a medium such as a tape cassette or to display tactile dots representative of non-Braille data appearing on a computer monitor or contained on another data storage medium.

In an alternate embodiment, an uppermost plate is positioned above and mounted on the elastic diaphragm. The uppermost plate has a plurality of through holes extending from its uppermost to lowermost surfaces, wherein the hole dimensions increase from the top to the base in three stepped lengths. These holes guide a plurality of spring-loaded pins positioned over each dot actuator chamber. A base segment of each pin has a larger dimension than the upper segment. A spring extends externally and circumferentially from the upper surface of the pin's base to the location on the pin corresponding to the uppermost shoulder in the stepped hole. Displacement of the portion of the elastic diaphragm above a particular dot actuator chamber pushes the pin upward, against the force of the spring contacting the uppermost shoulder, until the upper surface of the pin's base contacts the lowest shoulder in the stepped hole. The pin then protrudes from the top surface of the uppermost plate and is perceived tactually by the reader. This positive-stop configuration maintains consistent displacements of the pins in both their actuated and nonactuated positions. This configuration also avoids the possibility of diaphragm separation from the attached plate, isolates the reader from any diaphragm leakage, and isolates the reader from the high voltages required to activate the electrorheological fluid.

BRIEF DESCRIPTION OF THE DRAWINGS

A more complete appreciation of the invention and the many of the attendant advantages thereof will be readily obtained as the same becomes better understood by reference to the following detailed description when considered in connection with the accompanying drawings, wherein.

DETAILED DESCRIPTION OF THE INVENTION

Figure 1:
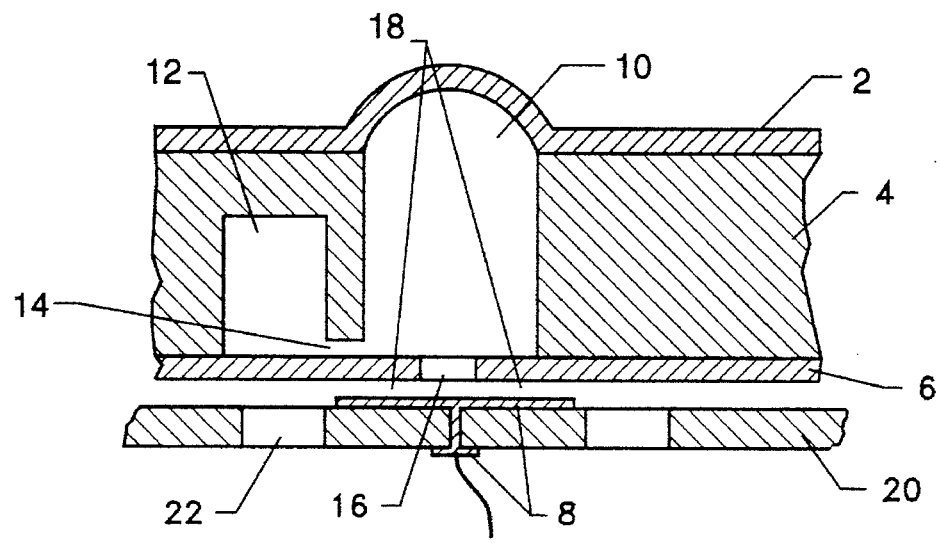
FIG. 1 is a cross-sectional view of a preferred embodiment of a single dot actuator, looking lengthwise along an electrorheological fluid supply manifold.

FIG. 1 is a cross-sectional view of a single tactile dot actuator. An elastic diaphragm 2 is fixed to the upper surface of a nonconductive plate 4. The elastic diaphragm can be made of any elastic material which is chemically resistant to electrorheological fluids, and the nonconductive plate 4 can be made of any insulating material which is chemically resistant to electrorheological fluids. A common ground electrode 6 is fixed to the lower surface of the nonconductive plate 4 and is common to the plurality of tactile dot actuators. This electrode can be a sheet of conductive material that is chemically resistant to the electrorheological fluid. Holes corresponding to the individual dots and extending through the nonconductive plate 4, from its upper surface to its lower surface, form individual dot actuator chambers 10.

Electrorheological fluid flows into the dot actuator chamber 10 from the supply manifold 12 by way of the flow-restricting orifice 14. The supply manifolds 12 run parallel to one another internal to and across the nonconductive plate 4. The electrorheological fluid flows out of the dot actuator chamber 10 by way of the exhaust orifice 16 located through the common ground electrode 6. A lower nonconductive plate 20 is positioned beneath and in close proximity to the common ground electrode 6. The lower nonconductive plate 20 can be made of any nonconductive material which is chemically resistant to the electrorheological fluid. A conductive dot electrode 8 is fixed to the nonconductive plate 20 such that a flat-surface of the electrode is fixed to the upper surface of the nonconductive plate 20, at a position corresponding to each dot actuator chamber. The electrorheological fluid continues to flow from the exhaust orifice 16 through the valving region 18 formed by the clearance between the common ground electrode 6 and the conductive dot electrode 8. When voltage is applied between a conductive dot electrode 8 and the common ground electrode 6, the viscosity of the electrorheological fluid between the two electrodes is increased to the extent that fluid flow between the two electrodes is restricted, causing a pressure to be built up in the dot actuator chamber 10. This pressure increase deflects the elastic diaphragm 2 such that a lump is formed which is perceived by the reader as one dot in a Braille character. The voltage which is required across the electrorheological fluid is reduced as the distance separating the electrodes 6 and 8 is reduced. The only limitation on the minimization of the distance between the electrodes 6 and 8 is the necessity of sufficient flow area between the electrodes to allow the electrorheological fluid to flow out of the dot actuator chambers 10 with minimum restriction, so that little pressure is built up in a particular dot actuator chamber 10 when its corresponding dot is meant to be in its unpressurized state. Source entry passageways 22 formed by holes in the nonconductive plate 20 allow continual free flow of the electrorheological fluid through the lower nonconductive plate 20 to a fluid source, such as a sump, from which the electrorheological fluid is pumped back into the supply manifolds 12.

Figure 2:
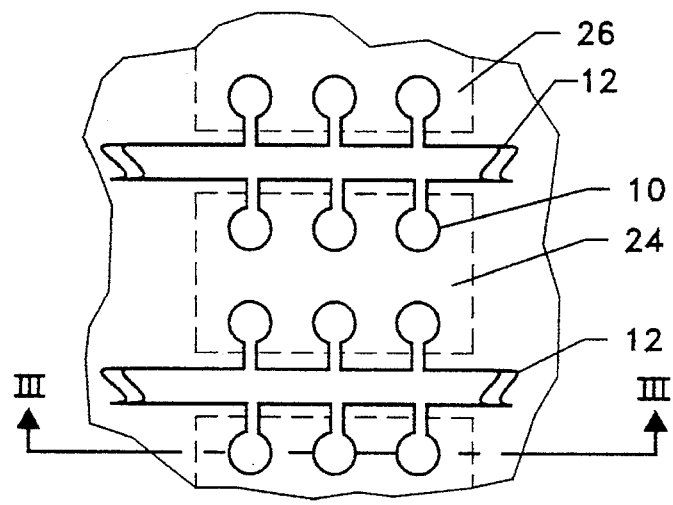
FIG. 2 is a layout of six dot-actuators arranged to form one Braille cell.

FIG. 2 is a layout of six dot-actuators arranged to form one Braille character cell 24, along with a portion of adjacent cells 26. Each supply manifold 12 supplies electrorheological fluid to the interfacing dot actuator chambers 10 located on each of its sides.

Figure 3:
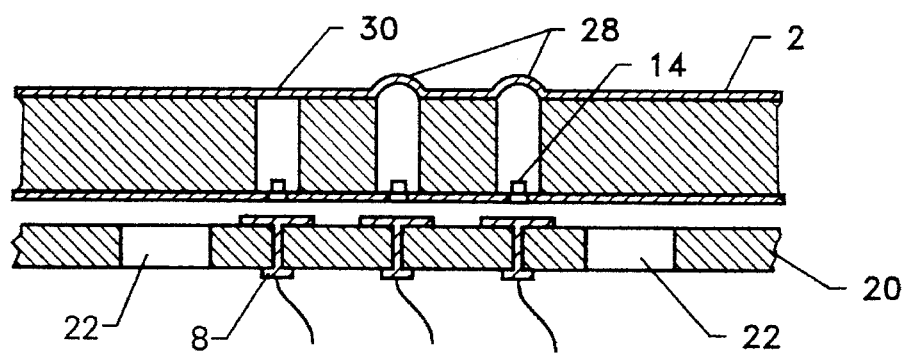
FIG. 3 is a cross-sectional diagram of the device shown in FIG. 2 taken along lines III—III.

FIG. 3 is a cross-sectional diagram of the section of the device shown in FIG. 2 along lines III—III. Tactile dots 28 are in their pressurized states. Tactile dot 30 is in its unpressurized state.

Figure 4:
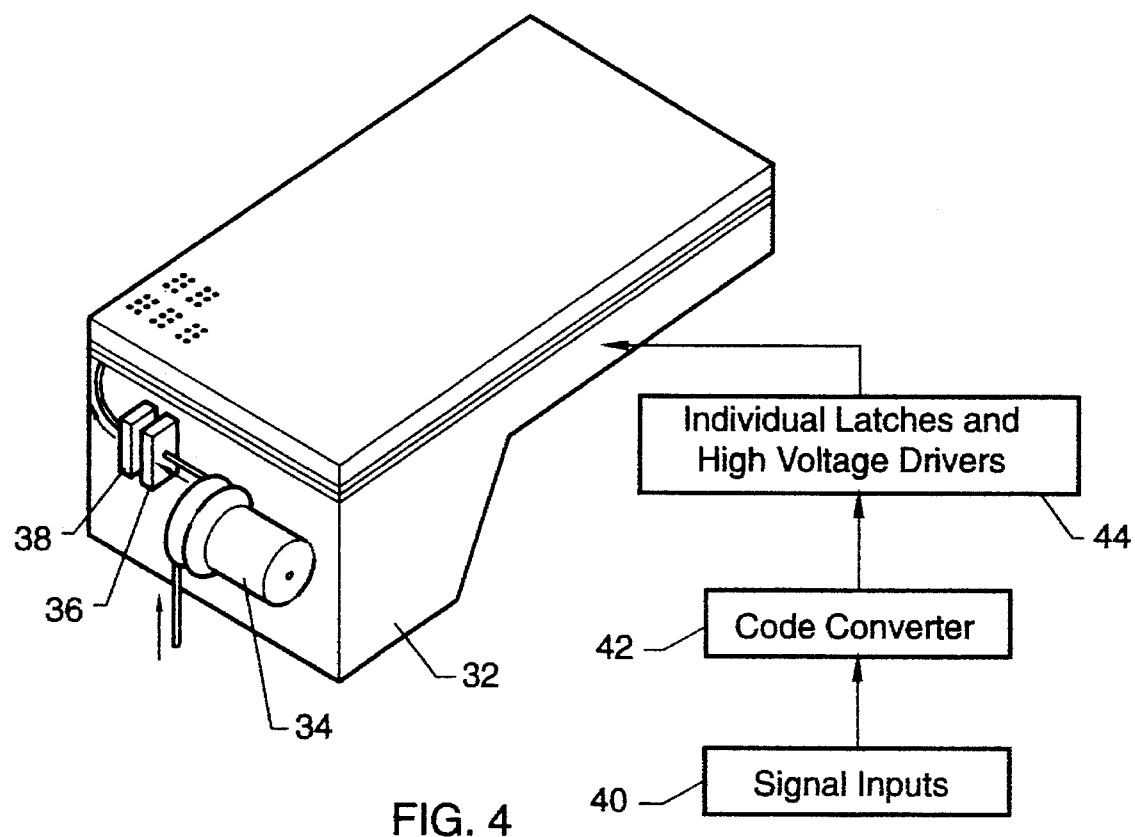
FIG. 4 is a layout of a complete page of Braille character cells with the associated fluid flow regulation system required to energize it, and a block diagram representing suitable electronic circuitry for electrical signal input and voltage supply.

FIG. 4 is a layout of a complete display of Braille character cells with the associated fluid flow regulation system required to energize it, and suitable electronic logic required to supply voltage to the conductive dot electrodes. The electrorheological fluid is stored in sump 32. The electrorheological fluid is pumped by a low-pressure fluid pump 34 through a filter 36 and pressure regulator 38 into the supply manifolds. The use of a filter 36 is standard in hydraulic systems. The pressure regulator 38 maintains a continual pressure throughout the system during the pressurizing and unpressurizing of the plurality of tactile dots. By controlling the pattern of voltages applied to the conductive dot electrodes, the pattern of dots perceived by the reader may be arranged to represent any character desired. Suitable electronic logic is used to read signal inputs 40 from a data storage medium in the form of ASCII or other code, convert it 42 into Braille code if necessary, and latch it into high-voltage drivers 44 attached to each individual dot actuator on the page to produce a full-page Braille display corresponding to the text received from the data storage medium.

Figure 5:
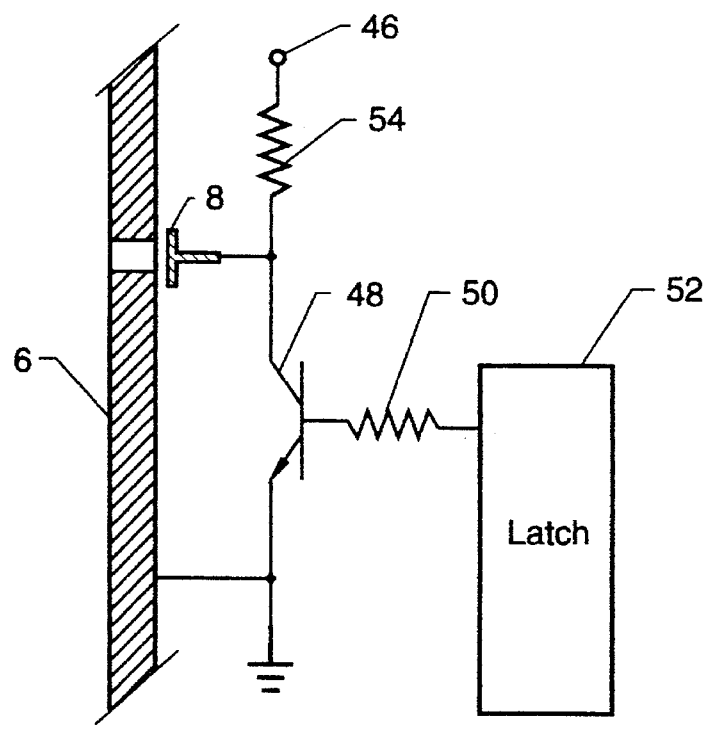
FIG. 5 is a diagram showing further detail of suitable electronic logic.

FIG. 5 is a diagram showing further detail of suitable electronic logic. The driving circuitry can be powered by a single high-voltage supply 46 for the plurality of tactile dots, a high-voltage transistor 48 for each tactile dot which is positioned between the common ground electrode and each conductive dot electrode, a base resistor 50 between the output from a multichannel circuit latch 52 and transistor 48, and a collector resistor 54 between the high-voltage supply 46 and each conductive dot electrode. This is standard electronic "switch" circuitry for controlling voltage between off and on which is known to those skilled in the art. Other suitable electronic logic and further details of the disclosed electronic circuitry will be known to those skilled in the art.

Figure 6:
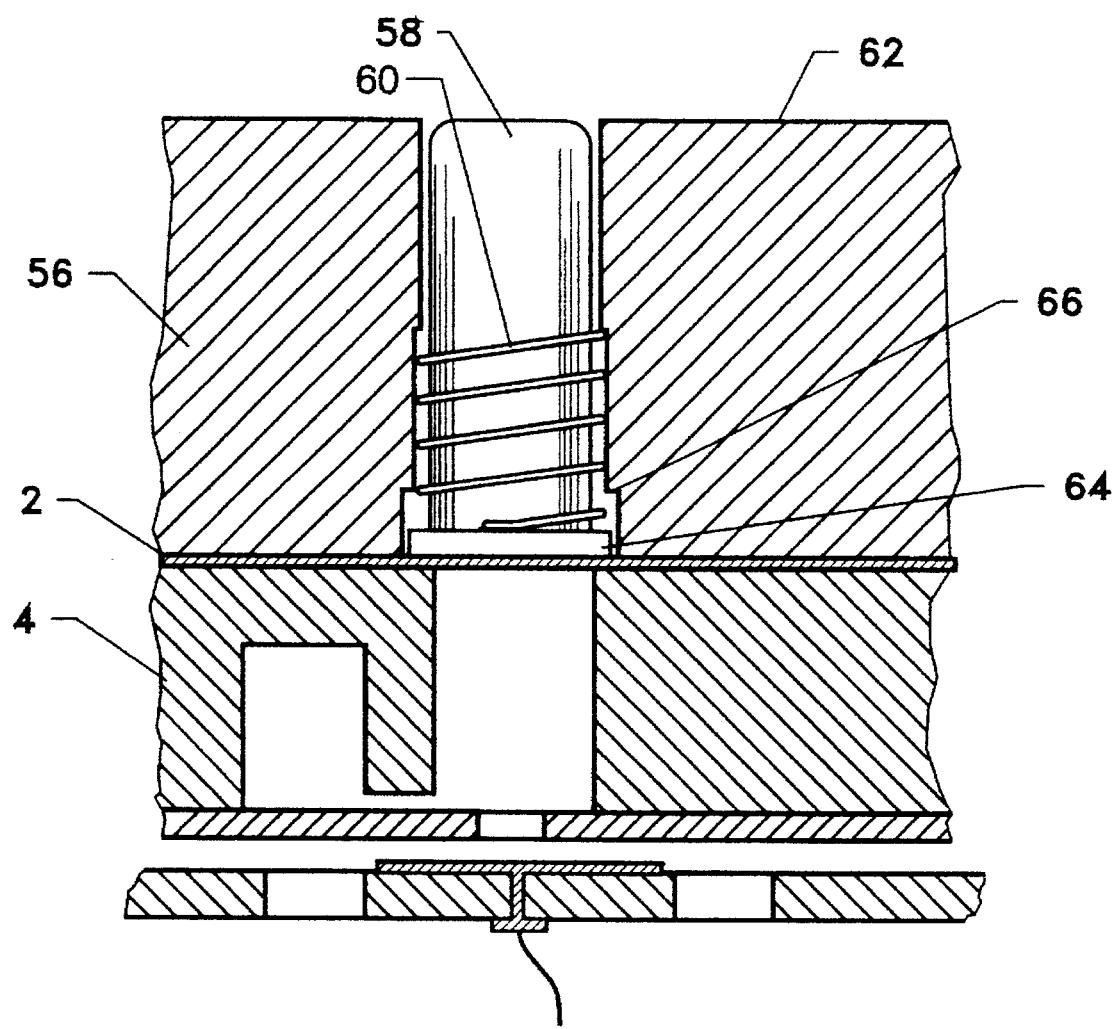
FIG. 6 is a view similar to FIG. 1, but showing a second embodiment.

FIG. 6 is a second embodiment. An uppermost plate 56, which has a plurality of holes extending from its upper surface to its lower surface, is positioned above and mounted on elastic diaphragm 2 in order to support and guide a plurality of spring-loaded pins 58 which are positioned above each dot actuator diaphragm. When actuated, the pin 58 extends above the upper surface of the uppermost plate 56 to be detected by the reader. The engagement of spring 60, extending circumferentially around an exterior portion of pin 58, with shoulder 62 provides a downward force to the pin to ensure that it returns to its unactuated position once pressure is removed from the diaphragm 2. A positive stop, wherein the larger diameter portion 64 of the pin 58 engages the shoulder 66 of the uppermost plate 56, allows for consistent displacement among the individual tactile dots to aid the reader's detection of raised versus flat dots. This embodiment also avoids the possibility of diaphragm separation from the plate 4, provides the reader a measure of isolation from any leakage which might occur from the diaphragm 2, and isolates the reader from the high voltages required to activate the electrorheological fluid.

Obviously, numerous additional modifications and variations of the present invention are possible in light of above teachings. It is therefore to be understood that within the scope of the appended claims, the invention may be practiced otherwise than is specifically described herein.

What is claimed is:

1. A device for producing a full-page, refreshable tactile display of one or more tactile dots, including Braille characters, comprising:

an electrorheological fluid;

an upper nonconductive plate;

a lower nonconductive plate, beneath and in close proximity to the upper nonconductive plate;

a plurality of dot actuator chambers partially formed by a plurality of holes extending from the upper surface of the upper nonconductive plate to the lower surface of the upper nonconductive plate;

a flow regulation means for regulating the flow of the electrorheological fluid into and out of the dot actuator chambers maintaining overall flow pressurization, and preventing unwanted pressure build-up in the dot actuator chambers;

a common ground electrode, common to the plurality of dot actuator chambers, which is mounted on the lower surface of the upper nonconductive plate and which defines the lower end of each dot actuator chamber;

a plurality of conductive dot electrodes which are mounted on the upper surface of the lower nonconductive plate, wherein each conductive dot electrode corresponds to a single tactile dot and is in close proximity to the common ground electrode;

one or more electrical signal inputs;

an electronic means, driven by the electrical signal inputs, for selectively supplying voltage to the conductive dot electrodes, thereby producing electrorheological fluid build up in the corresponding dot actuator chambers; and a display means which defines the upper end of each dot actuator chamber and which interacts with the dot actuator chambers to convert the build-up of electrorheological fluid in the dot actuator chambers into the tactile display.

2. The device of claim 1 wherein the display means comprises:

an elastic diaphragm which is mounted on the upper surface of the upper nonconductive plate which, when displaced at a dot actuator chamber location by the electrorheological fluid build-up in the dot actuator chamber, forms a tactile dot to be perceived by the reader.

3. The device of claim 1 wherein the display means comprises:

an elastic diaphragm which is fixed to the upper surface of the upper nonconductive plate and which is displaced at a dot actuator chamber location by the electrorheological fluid build-up;

an uppermost display plate which is fixed to the upper surface of the elastic diaphragm and through which are a plurality of holes centered above each dot actuator chamber and extending vertically from the upper to lower surfaces of the uppermost plate in stepped-diameter lengths; and spring-loaded pins, positioned in each hole in the uppermost display plate and resting on the elastic diaphragm which interact with the stepped-diameter holes to provide positive-position control upon displacement of the elastic diaphragm.

4. The device of claim 1 wherein the flow regulation means comprises:

an electrorheological fluid source, an inlet flow means by which the electrorheological fluid flows from the electrorheological fluid source into the dot actuator chambers, and an outlet flow means by which the electrorheological fluid flows out of the dot actuator chambers and back to the electrorheological fluid source.

5. The device of claim 4 wherein the inlet flow means comprises:

a low-pressure fluid pump which pumps the electrorheological fluid from the electrorheological fluid source;

a filter which receives the electrorheological fluid from the pump;

a pressure regulator which receives the electrorheological fluid after passage through the filter;

a plurality of parallel supply manifolds which receive the electrorheological fluid from the pressure regulator and wherein each supply manifold serves a plurality of dot actuator chambers; and a flow restricting orifice, corresponding to each dot actuator chamber, through which the electrorheological fluid flows from the corresponding supply manifold to the corresponding dot actuator chamber.

6. The device of claim 4 wherein the outlet flow means comprises:

an exhaust orifice through the common ground electrode which corresponds to each dot actuator chamber and through which the electrorheological fluid flows from the dot actuator chamber;

a valving region between the common ground electrode and each dot control electrode; and a plurality of source entry passageways formed by holes in the lower nonconductive plate, which produce free flow of the electrorheological fluid from the exhaust orifices, through the valving regions, to the electrorheological fluid source.

7. The device of claim 6 wherein the exhaust orifice has a flow area sufficiently sized to prevent unwanted pressure buildup in the plurality of dot actuator chambers.

8. The device of claim 6 wherein the valving regions are sized such that the voltage across the electrorheological fluid is minimized to the extent that adequate flow out of the dot actuator chambers is maintained.

9. The device of claim 1 wherein the electrical signal inputs are representative of data stored on a data storage medium.

10. The device of claim 1 wherein the common ground electrode and the conductive dot electrodes have flat surfaces.

11. The device of claim 10 wherein the flat surface of the common electrode and the flat surface of each conductive dot electrode are parallel, such that uniform voltages are produced across the electrorheological fluid.

12. The device of claim 1 wherein the electronic means comprises:

a high-voltage source, a latching means which accepts the electrical signal input and maintains a particular display state, a high-voltage driver means which selectively supplies voltage to the conductive dot electrodes utilizing the output from the latching means and the high-voltage source.

13. The device of claim 1 wherein the electronic means comprises:

a high-voltage source, a code converter means which converts the electrical signal input into a Braille representation, a latching means which accepts the electrical signal inputs from the code converter means and maintains a particular display state, and a high-voltage driver means which selectively supplies voltage to the conductive dot electrodes utilizing the output from the latching means and the high-voltage source.

14. The device of claim 13 wherein the high-voltage driver means is a transistor switch.

15. A method for producing a tactually readable pattern of dots, comprising the steps of:

reading data from a data storage medium;

producing electrical signals representative of said data;

translating the electrical signals into a Braille representation;

selectively producing voltages in response to the Braille representation of the electrical signals;

applying the voltages uniformly across an electrotheological fluid to increase the electrorheological fluid's viscosity, by means of a single, flat-surfaced ground electrode common to each individual dot and a flat-surfaced conductive electrode corresponding to each individual tactile dot and whose flat surface is parallel to the common ground electrode;

utilizing the viscosity increase of said electrorheological fluid to effect valving external to a dot actuator chamber to produce a build-up of electrorheological fluid in the chamber; and using the pressure increase produced by the build-up of electrorheological fluid in the chamber to form a tactually readable dot on a display surface.

* * * * *